July 31, 1962  P. J. VAUGHAN  3,047,404
PACKAGING RED MEATS
Filed Sept. 23, 1958

INVENTOR.
PAUL J. VAUGHAN
BY
*P. L. Miller*
ATTORNEY

United States Patent Office 3,047,404
Patented July 31, 1962

3,047,404
PACKAGING RED MEATS
Paul J. Vaughan, Cuyahoga Falls, Ohio, assignor to The Goodyear Tire & Rubber Company, Akron, Ohio, a corporation of Ohio
Filed Sept. 23, 1958, Ser. No. 762,839
5 Claims. (Cl. 99—174)

This invention relates to prolonging the life of the red color of freshly cut red meat. The cut may be a steak, chop, roast or ground meat, etc. By "red meat" is meant beef, veal, pork, lamb and other meats which have not been preserved by smoking, curing or other such treatment and which depend upon their red color to be salable.

The red color of freshly cut meat is caused by pigment substances which are purple until exposed to oxygen, such as the oxygen of the air. On exposure for about 15 to 30 minutes, the pigment turns red. This is known as the bloom period. If there is insufficient oxygen in the atmosphere surrounding the cut meat after the pigment has become red, as when it is packaged in an air-impermeable film, it will turn gray or brown.

The oxygen within a meat package is consumed slowly by bacterial growth on the surface of the meat and by the action of natural enzymes within the meat. Both the rate of bacterial growth and enzymic action are controlled by temperature. Therefore, it is desirable to display meat packages at the lowest, commercially feasible temperature without danger of freezing, in order to minimize the oxygen consumption.

At the present time, red meat, after being cut into retail cuts, whether unpackaged or packaged in oxygen-permeable transparent film, when displayed in a retail store remains salable, i.e. it remains red, over a period of 2 to 3 days. By "oxygen-permeable" reference is made to film that is permeable to the oxygen in the surrounding atmosphere. The oxygen content of this atmosphere will be at least substantially 30 percent and may be as much as 100 percent.

According to this invention, the period during which such meat remains salable after being cut into retail cuts is prolonged by as much as 5 days by keeping it in an oxygen-enriched atmosphere before putting it on display. It may be unpackaged or packaged in oxygen-permeable film during its stay in the oxygen-enriched atmosphere, and may be taken out of the oxygen-enriched atmosphere at any time during this 5-day period. Thereafter it is put on display and retains its red color for the usual 2- to 3-day period. Thus, the invention does not increase the display life of the meat, but it provides an additional period in which it is red of up to 5 days after cutting and before being put on display, and this permits cutting and packaging at a central location, as at a warehouse, with distribution of the cut meat, preferably packaged in permeable film for distribution to retail outlets where it is put on display for sale.

Packages of meat prepared according to this invention may be so small as to each contain a single patty for a steak sandwich, or each individual package may contain several such patties or a roast, etc. For display in a supermarket such packages must keep their red color during the display period, and packages remaining unsold at the end of the day must be kept in salable condition for display on the next business day.

The wrappers used for display in the supermarkets are transparent, so that transparent wrappers will be referred to more particularly herein. Wrappers which are permeable to the passage of oxygen have been developed relatively recently, and these permit meat packaged in them to retain its salable red color for as much as two or three days. This is not sufficient to permit the production of individual packages at a central station, with distribution from there to the supermarkets or other retail outlets. For such central packaging, the red color of the meat must be maintained for several days and preferably for as long as a week, so that a small inventory may be kept in reserve at a supermarket or like retail establishment, and the packages may be kept over a long week-end when necessary. Preservation of the red color for such longer periods is likewise often desired where the meat is packaged within the establishment where it is dispensed. Such prolonged preservation of the red color is provided by this invention.

To preserve the red color of meat packaged in permeable film before putting it on display, the packages are enclosed in containers in an atmosphere of high oxygen content and are kept there until they are put on display. The wrapping material used for permeable bags or wrappers is for example, MSAD-80 cellophane, 150-gauge polyethylene, or FM-1 Pliofilm or the like. As illustrative of the package, a single ply of 75-gauge rubber hydrochloride film of the following composition may be used.

| | Parts by weight |
|---|---|
| Rubber hydrochloride | 100 |
| Dibutyl sebacate | 15 |
| 2-ethylhexyl-diphenyl phosphate | 15 |
| Silica aerogel | 1.0 |

The red meat covered with a single ply of this film retains its red color for a longer period than when packaged in rubber hydrochloride film plasticized with the usual plasticizers, or cellophane with a moisture-tight coating, or film formed from vinylidene chloride resin or other impermeable film.

According to this invention, the meat packaged in such a permeable film is placed in a container which is at least partially evacuated and oxygen is then introduced into it so that the atmosphere within the container has an oxygen content of at least about 30 percent by weight; or, without evacuation, oxygen or ozone or an oxygen-enriched gas is flushed through the container until its oxygen content is raised to at least about 30 percent, and the life of its red color is maintained by keeping it in this oxygen-enriched atmosphere for up to 5 days, until it is put on display. Alternatively, an oxygen-generating chemical may be placed in the container, preferably after first partially evacuating it. On completing any such operation, the pressure of the atmosphere within the container will usually be the same as that on the outside of the container. It would be possible to package the meat in an atmosphere under a pressure above normal, or even less than normal, but this is not necessary and more expensive containers would be required for the purpose.

In packaging the meat in individual packages in an oxygen-enriched atmosphere, they are separated from one another so that they are exposed to the atmosphere within the container. They are advantageously packaged on trays or shelves and if the meat is not packaged on a backboard or the like, these are preferably perforated or made of wire screen or otherwise constructed to give the atmosphere access to the bottom of the package, although it may lie on an imperforate shelf. The trays are spaced so that the atmosphere can circulate between them and have access to the tops and all sides of the contained packages.

The interiors of the containers are kept at the ordinary temperatures used for meat storage, and may be heat-insulated, and they may contain provision for the inclusion of ice or other suitable refrigerant. Non-insulated containers may be stored in a refrigerator. The containers may be disposable or constructed for reuse. They may be relatively small and hold only a relatively few packages, or they may be large and hold several hundred packages. If the container holds only a relatively few packages, or packages of irregular shape such as large roasts, for example, shelves will not be necessary. The container may be in the form of a trailer which is hauled from the packaging plant to a supermarket or the like where it may remain for several days before its entire contents are eventually removed to a display counter for sale. The last of the small packages may not be removed from the trailer until as long as five days after the packaged meat has been put in it. When empty, the trailer will be returned to the packaging plant for refilling.

Although reference has been made more particularly to the display and sale of red meats in a supermarket, the invention applies equally well to the delivery of red meats to other meat markets, restaurants and the like where individual cuts or patties or the like are placed on display or required for delivery direct to an individual. These are referred to herein as retail outlets.

The invention will be further described in connection with the accompanying drawings, in which—

Figure 1:
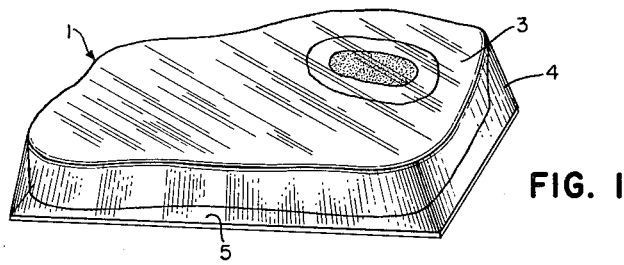
FIG. 1 is a view in perspective of an individual package containing a steak.

FIG. 1 illustrates any small individual package of freshly cut red meat. The package 1 contains a beefsteak 3 wrapped in oxygen-permeable film 4. A support 5 of cardboard or the like may be contained within the package, but this is optional.

Many small packages 1 employing permeable film, are placed in the container 6 immediately after packaging or as a final step in the packaging operation. This container may be of the general type shown in FIG. 2. The lid hinged at 7 is separated from the top wall of the body of the container by the sealing gasket 8 which is designed to prevent loss of oxygen from the interior of the container. If the meat is packaged at atmospheric pressure and the lid makes a tight seal without a gasket, the use of a gasket, although preferred, is not necessary.

The trays 10 are of plywood, thin metal, or the like. They are individually supported by any suitable means within the container, as by blocks 12 located at the four corners. These blocks may be fastened to the trays, or may be loose, and will be of different heights for the accommodation of packages of different thicknesses. Blocks of different heights may be used to separate the trays in a single container different distances from one another to accommodate patties of ground beef, steaks and roasts, etc. all in one container, and different kinds of meat such as beef, veal, etc. may be packaged in the same container. If the container opens at the side so that sliding shelves can be used, spacers may be built into the container so that the shelves may be conveniently spaced as desired. It is customary to place the packages on each tray only one package thick to provide adequate access to the surrounding atmosphere.

After filling the container with trays of the packaged meat the cover is lowered and fastened tight. The container is provided with at least one gas inlet 15 and at least one gas outlet 16. Oxygen is introduced through one or more inlets in one portion of the container while allowing the air (together with a gradually increasing amount of the freshly admitted oxygen) to escape through one or more outlets; and this procedure will be continued until the average oxygen content of the air within the container has been brought to the desired level. Then the one or more inlets and outlets are closed. If hoses are used for the introduction of oxygen and removal of the air, they may be removed from openings provided for this purpose, and then the openings will be closed by plugs or suitable caps (which may be screwed on to threads on the outside thereof) or the like. Alternatively, the inlets and outlets may be valved. If the pressure within the container is the same as that outside of the container, it is not necessary that the inlets and outlets be closed immediately, as the lapse of a minute or two will do no real damage. Any suitable means for enriching the air with oxygen can be employed, and various fittings, etc. will be used as required.

Figures 3, 4:
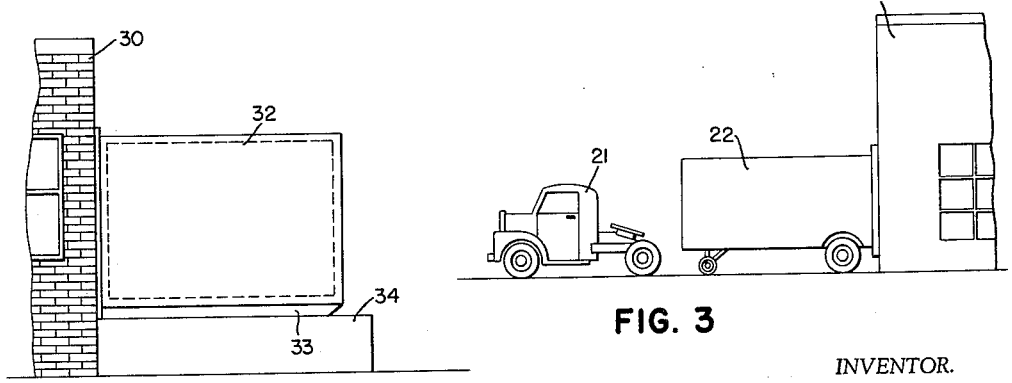
FIG. 3 shows a trailer for the packaged material outside of a store or the packaging plant.
FIG. 4 shows a different type of large container on skids outside of a store or the packaging plant.

FIGURES 3 and 4 illustrate large containers which may be placed at a door of the packaging plant and then after filling, be transferred to a like door in a supermarket or the like where the packages are used. The container may be a trailer, which may be as large as or smaller than the average trailer used for other purposes. It may be refrigerated. It may be partitioned so that when the outside door is opened the air will circulate through only a part of it. This container may contain sufficient meat to supply the needs of the supermarket for an average two-day or three-day period or a week. It may not reach the market on the day following the packaging of the meat, but may arrive a day or two later, and this will be customary for meat delivered on Monday mornings or the day following a holiday. Meat which has been treated in an oxygen-enriched atmosphere, as described herein, remains salable even though there is such a delay of up to five days before it is put on display. This gives greater flexibility and makes possible economies not possible with the present practice which requires each retailer to estimate some time in advance how much meat must be packaged for the day's requirements, so that the packaged meat will not remain on his hands for more than two or three days after packaging. Because it is not conducive to the sale of meat to have the display cases emptied near the end of the day, advance estimates are required which are not entirely reliable and result in the retailer having unsalable packaged meat on his hands.

In FIG. 3 the building 20 may be the packaging center or a supermarket or the like. The meat will be delivered from the packaging center by the tractor 21, packaged in the trailer 22. After delivering the trailer to the supermarket or other retail outlet, the tractor will be disconnected for other use while the retailer is removing meat from the trailer, a little at a time as required. The meat is packaged in the trailer in an atmosphere of relatively high oxygen content. Preferably there will be compartments within the trailer so that the entire meat load will not be subjected to an atmosphere of ordinary oxygen content as soon as its door is opened, although compartments are not necessary if the whole trailer load is to be disposed of before the close of the day.

FIGURE 4 shows a similar arrangement at a like building 30, except that no trailer is shown but a large container 32 of any desired size. It is equipped with skids 33 so that it can be easily transferred from a truck or the like to the platform 34 with its door adjacent the building 30. It is so constructed that its door cooperates with the door opening into the building. The meat packages will be removed gradually as required.

FIGURES 3 and 4 show a trailer or large container jutting out from a store building. This is for illustration only. In practice, the space for this may well be provided within the general outline of the building as by building a niche in the building of the size required to accommodate a trailer or other container.

Figure 2:
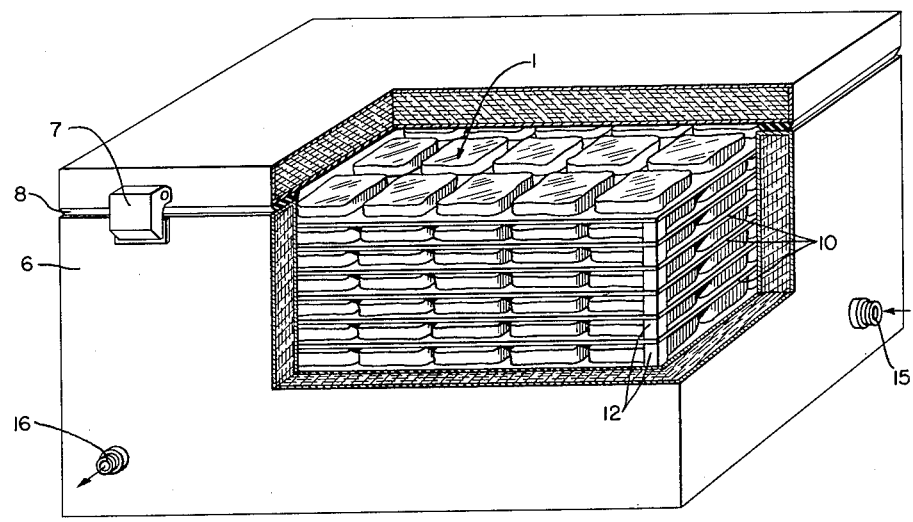
FIG. 2 is a view in perspective of a container with many individual packages in it.

The trailer 22 or other container 32 will be provided with an oxygen inlet and air outlet, much as those described in connection with FIG. 2, except that they will be designed to handle a larger volume of air; or, if the trailer or other container is built with compartments, each such compartment will be provided with an air outlet and oxygen inlet. Generally, after the trailer has been opened, the oxygen content of the air within it will be maintained above normal by the introduction of oxygen continuously or from time-to-time from an oxygen tank within the building or from some other suitable oxygen or ozone source. This is not necessary if the interior of the trailer is divided into sealed compartments.

The container, etc. are described in general terms which show the possibility of accommodating this procedure to any conditions. The individual packages in permeable film are preferably separated so that a majority of the surface of each package is exposed to the atmosphere. No set minimum of oxygen content of the atmosphere within the container is required. With any type of container atmospheres of different minimum oxygen contents may be utilized from time to time, with replenishment of the oxygen from time-to-time as required.

The invention is covered by the claims which follow.

What I claim is:

1. The method of prolonging the life of freshly cut red meat which comprises
    exposing a freshly cut surface of the meat to an atmosphere containing at least 30 percent by weight of oxygen
    while the meat is enclosed in an oxygen-permeable transparent container,
    for a period not greater than substantially five days,
    and then displaying the meat for sale while still in the container.

2. The method of prolonging the life of freshly cut red meat which comprises
    preparing a plurality of packages of freshly cut red meat at a packaging center by enclosing the meat in oxygen-permeable transparent film,
    placing the packages in a container with at least a majority of the surface of each package exposed to the atmosphere within the container,
    providing in the container an atmosphere with an oxygen content of at least 30 percent by weight to provide the individual packages with an atmosphere containing a high content of oxygen whereby after removal of the packages from the container the meat retains its red color for a prolonged period,
    transporting the container with the wrapped meat therein from the packaging center to a retail outlet,
    there removing the packages from the container before they have been in it for a period substantially exceeding five days, and then
    placing the meat on display while still wrapped in the film.

3. In combination, an oxygen-impermeable container in which the oxygen content is substantially greater than that of air, and
    a plurality of individual packages of freshly cut red meat in the container, each wrapped in oxygen-permeable transparent film,
    the container being provided with means for maintaining a high oxygen content therein.

4. In combination with an oxygen-impermeable container,
    freshly cut red meat therein wrapped in oxygen-permeable, transparent film, the atmosphere in the container comprising at least substantially 30 percent by weight of oxygen.

5. In combination with an oxygen-impermeable container,
    beef with a freshly cut red surface therein wrapped in oxygen-permeable, transparent film, the atmosphere in the container comprising at least substantially 30 percent by weight of oxygen.

References Cited in the file of this patent

UNITED STATES PATENTS

| | | |
|---|---|---|
| 2,071,300 | Gammeter | Feb. 16, 1937 |
| 2,711,373 | Coleman et al. | June 21, 1955 |
| 2,772,172 | Carson | Nov. 27, 1956 |
| 2,804,257 | Hasler et al. | Aug. 27, 1957 |
| 2,821,338 | Metzger | Jan. 28, 1958 |
| 2,830,909 | Hagen et al. | Apr. 15, 1958 |
| 2,942,428 | Morrison | June 28, 1960 |
| 2,947,638 | Snyder et al. | Aug. 2, 1960 |